US008250139B2

(12) United States Patent
Ahuja et al.

(10) Patent No.: US 8,250,139 B2
(45) Date of Patent: Aug. 21, 2012

(54) DEMAND-DRIVEN, COLLABORATIVE SYSTEMS AND PROCESSES FOR COLLECTING STRUCTURED INFORMATION

(75) Inventors: Sundeep Ahuja, Gold River, CA (US); David Selinger, Castro Valley, CA (US)

(73) Assignee: RichRelevance, Inc., San Francisco, CA (US)

( * ) Notice: Subject to any disclaimer, the term of this patent is extended or adjusted under 35 U.S.C. 154(b) by 956 days.

(21) Appl. No.: 12/070,587

(22) Filed: Feb. 19, 2008

(65) Prior Publication Data
US 2008/0262896 A1  Oct. 23, 2008

Related U.S. Application Data

(60) Provisional application No. 60/890,653, filed on Feb. 20, 2007.

(51) Int. Cl.
*G06F 15/16* (2006.01)
(52) U.S. Cl. ........ 709/204; 709/206; 709/223; 709/224; 705/300; 705/319; 434/322; 434/350
(58) Field of Classification Search ................. 709/204, 709/206, 223, 224; 705/10, 300, 319; 434/322, 434/350
See application file for complete search history.

(56) References Cited

U.S. PATENT DOCUMENTS

| 7,107,311 | B1* | 9/2006 | Zittrain et al. | 709/204 |
|---|---|---|---|---|
| 7,107,312 | B2* | 9/2006 | Hackbarth et al. | 709/204 |
| 7,490,146 | B1* | 2/2009 | Motoyama et al. | 709/224 |
| 2004/0148226 | A1* | 7/2004 | Shanahan | 705/26 |
| 2004/0230676 | A1* | 11/2004 | Spivack et al. | 709/223 |
| 2006/0089987 | A1* | 4/2006 | Igarashi et al. | 709/225 |
| 2006/0190475 | A1* | 8/2006 | Shi | 707/102 |
| 2006/0194185 | A1* | 8/2006 | Goldberg et al. | 434/350 |
| 2007/0067268 | A1* | 3/2007 | Dai et al. | 707/3 |
| 2008/0195480 | A1* | 8/2008 | Calabria | 705/14 |

OTHER PUBLICATIONS

International Search Report and Written Opinion for PCT/US2008/002196 dated Jun. 10, 2008.

* cited by examiner

*Primary Examiner* — Moustafa M Meky
*Assistant Examiner* — Michael C Lai
(74) *Attorney, Agent, or Firm* — Seed IP Law Group PLLC (57) ABSTRACT

A demand driven process of collecting structured product and service information including the steps of: receiving a request for information from a requestor about a specific product or service, or attribute or class thereof, associating one or more potential responders with the request for information, providing the request to the potential responders, receiving and organizing one or more responses, and providing the organized responses to the requestor, all electronically. An arrangement for the same includes user computers for receiving requests for information, network communication devices for transmitting the requests to potential responders, memory for storing electronic responses and a controller for organizing, updating, and providing access to the electronic responses.

24 Claims, 10 Drawing Sheets

Which friends would you like to ask?

(602)

☐ Make this request private to my friends

Name　Email　Zipcode

Give your friends some options to rate
Option　Comment　(603)

Customize your email
Subject

Body submit (601)

Fig. 6

Which friends would you like to ask?

☐ Make this request private to my friends (702)

Name  Email  Zipcode

Give your friends some options to rate
Option  Comment  (703)

Customize your email
Subject
Body  (704)

submit  (705)

DEMAND-DRIVEN, COLLABORATIVE SYSTEMS AND PROCESSES FOR COLLECTING STRUCTURED INFORMATION

CROSS-REFERENCE TO RELATED APPLICATIONS

This application claims the priority benefit of U.S. Provisional Application Ser. No. 60/890,653, filed Feb. 20, 2007, entitled "Method and system for collecting structured input and reviews," which is herein incorporated by reference.

TECHNICAL FIELD

The disclosed embodiments relate generally to systems and processes for collecting demand-driven structured information. More specifically, the present subject matter relates to systems and processes for collaborative collection of structured information, such as recommendations, ratings and reviews, by electronically requesting and/or collecting input from identified responders.

BACKGROUND

Product and service recommendations and reviews can be beneficial to people when making purchase decisions. Currently, sites such as CNET.com and Amazon.com are popular for the recommendation, rating and review content they have. Other popular sites, such as yelp.com and epinions.com are wholly dedicated to providing a place for people to review, rate and recommend product and services. However, consumers of these recommendations, ratings and reviews often don't know which recommendations, ratings or reviews to trust as they are authored or provided by anonymous or unknown individuals. Further, what is recommended for one person may not be applicable to another, and so consumers have a difficult time ascertaining if the recommended, rated or reviewed product or service is best for them, specifically. Finally, for many products or services (or classes thereof), there is little to no recommendation, rating or review content in the public domain.

Further, structured product and service information with explicit attribute detail that results from demand-driven collaboration between two or more parties can be beneficial in a variety of ways, such as when making purchase decisions. Currently, people sometimes use email to ask friends for input on a product or service, and through a series of "reply-alls" a conversation takes place—however, the information is unfortunately not at all structured or attribute driven, nor does it leverage the information already available in the public domain (email is simply subject & body). Wikis are also sometimes used for collaboration between two or more parties, but the structure of the information is amorphous (a significant amount of effort is required to structure a wiki to be attribute oriented, and even then, it can not intelligently access information in the public domain), and the information itself is "supply driven" in the sense that supply driven refers to information that is supplied for an incentive (e.g., money, reputation, the greater good, etc), not "demand driven" (e.g., in response to a request) Accordingly, neither email, nor a wiki nor any other tool currently in commercial production is the appropriate tool for two or more parties to use when making a product or service recommendation, or providing ratings and reviews, in a collaborative, structured way.

Also, people often will consult with friends, family, colleagues, and others for product or service information, but will do so in an un-collaborative way, such as through in-person conversations, phone conversations, or individual emails or text messages. In these cases, not every member of the conversation can see or respond to what other members are saying or suggesting. Further, these methods are inefficient and unstructured; no existing tool is built or optimized for this behavior.

Therefore, there exists a clear need for a demand-driven method to collect collaborative, structured, trusted, and personalized product and service information to, for example, aid people in making product and service purchase decisions.

SUMMARY

The above and other needs are met by the disclosed embodiments which provide systems and processes for collecting structured product and service information. Some of the solutions provided utilize email, phone, SMS (short message service), IM (instant messaging), social networks, or other communication platforms. Individuals access the systems and initiate a request for information, specifying (1) what they would like input on (including any relevant attributes), and (2) who they would like input from. The request is then distributed to the identified parties. As input is received and collected by the system, the individual can access the collaborative, structured input in an organized way, which may be wrapped with additional content (e.g., expert opinions, purchase options, etc.).

In one example, the disclosed embodiments solve these problems, at least in part, by utilizing an arrangement for collecting and collaborating around reviews. The arrangement includes a controller and associated memory in communication with one or more user computers via one or more network communication devices. The controller is adapted for: receiving an electronic request for a review from a first user computer, associating one or more potential responders with the request for a review using at least the information received from the first user computer or information stored in the memory, providing the request for a review to the potential user in an electronic format accessible via the user computers, receiving and organizing in the memory one or more electronic reviews from the responders, providing access to the organized electronic reviews to the requestor and to the responders in an electronic format accessible via the user computers, and updating the accessible organized electronic reviews in the memory as additional reviews are received.

In another example, the disclosed embodiments solve these problems, at least in part, utilizing a computer-readable medium having computer-executable instructions for collecting and collaborating around reviews, the computer-executable instructions performing the steps of: receiving an electronic request for a review from a requestor, associating one or more potential responders with the request, providing the request to the one or more potential responders in an electronic format, receiving and organizing one or more reviews from the responders, providing access to the organized reviews to the requestor and to the responders, all electronically, and updating the accessible organized electronic reviews as additional reviews are received.

In yet another example, the disclosed embodiments solve these problems, at least in part, by a process of collecting structured product and service information, the process including the steps of: receiving an electronic request for a review from a requestor, associating one or more potential responders with the request, providing the request to the potential responders via an electronic format, receiving and organizing one or more electronic reviews from the responders, providing access to the organized electronic reviews to the requestor and to the responders in an electronic form, and updating the accessible organized electronic reviews as additional reviews are received.

In a further example, the disclosed embodiments solve these problems, at least in part, by utilizing an arrangement for collecting structured product and service information. The arrangement includes a controller and associated memory in communication with one or more user computers via one or more network communication devices. The controller is adapted for: receiving an electronic request for information a specific product or service, attribute thereof, or class thereof from a requestor via a first user computer, associating one or more potential responders with the request for information using at least the information received from the first user computer or information stored in the memory, providing the request for information to the potential user via an electronic format accessible via the user computers, receiving and organizing in the memory one or more electronic responses from the responders; and providing access to the organized electronic responses to the requestor in an electronic form accessible via the user computers.

In a still further example, the earlier stated needs and others are further met by still other disclosed embodiments that enable a computer-readable medium having computer-executable instructions for collecting structured product and service information, the computer-executable instructions causing the arrangement to perform the steps of: receiving a request for information from a requestor, where the requested information is about a specific product or service, attribute thereof, or class thereof, associating one or more potential responders with the request, providing the request to the potential responders, receiving and organizing the responses, all electronically, and providing the organized electronic responses to the requestor.

In another example, the earlier stated needs and others may further be met by a process of collecting and collaborating around reviews, the process including the steps of: receiving an electronic request for information about a specific product or service, attribute thereof, or class thereof from a requestor, associating one or more potential responders with the request for information, providing the request for information to the potential responders via an electronic format, receiving and organizing one or more electronic responses from the responders, and providing the organized electronic responses to the requestor.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PREFERRED EMBODIMENTS

It is contemplated that the subject matter described herein may be embodied in many forms. Accordingly, the embodiments described in detail below are the presently preferred embodiments, and are not to be considered limitations.

In one example, the disclosed embodiments solve these problems, at least in part, by utilizing an arrangement for collecting and collaborating around reviews. The arrangement includes a controller and associated memory in communication with one or more user computers via one or more network communication devices. The controller is adapted for: receiving an electronic request for a review from a first user computer, associating one or more potential responders with the request for a review using at least the information received from the first user computer or information stored in the memory, providing the request for a review to the potential user in an electronic format accessible via the user computers, receiving and organizing in the memory one or more electronic reviews from the responders, providing access to the organized electronic reviews to the requestor and to the responders in an electronic format accessible via the user computers, and updating the accessible organized electronic reviews in the memory as additional reviews are received.

In another example, the disclosed embodiments solve these problems, at least in part, utilizing a computer-readable medium having computer-executable instructions for collecting and collaborating around reviews, the computer-executable instructions performing the steps of: receiving an electronic request for a review from a requestor, associating one or more potential responders with the request, providing the request to the one or more potential responders in an electronic format, receiving and organizing one or more reviews from the responders, providing access to the organized reviews to the requestor and to the responders, all electronically, and updating the accessible organized electronic reviews as additional reviews are received.

In yet another example, the disclosed embodiments solve these problems, at least in part, by a process of collecting structured product and service information, the process including the steps of: receiving an electronic request for a review from a requestor, associating one or more potential responders with the request, providing the request to the potential responders via an electronic format, receiving and organizing one or more electronic reviews from the responders, providing access to the organized electronic reviews to the requestor and to the responders in an electronic form, and updating the accessible organized electronic reviews as additional reviews are received.

In a further example, the disclosed embodiments solve these problems, at least in part, by utilizing an arrangement for collecting structured product and service information. The arrangement includes a controller and associated memory in communication with one or more user computers via one or more network communication devices. The controller is adapted for: receiving an electronic request for information a specific product or service, attribute thereof, or class thereof from a requestor via a first user computer, associating one or more potential responders with the request for information using at least the information received from the first user computer or information stored in the memory, providing the request for information to the potential user via an electronic format accessible via the user computers, receiving and organizing in the memory one or more electronic responses from the responders; and providing access to the organized electronic responses to the requestor in an electronic form accessible via the user computers.

In a still further example, the earlier stated needs and others are further met by still other disclosed embodiments that enable a computer-readable medium having computer-executable instructions for collecting structured product and service information, the computer-executable instructions causing the arrangement to perform the steps of: receiving a request for information from a requestor, where the requested information is about a specific product or service, attribute thereof, or class thereof, associating one or more potential responders with the request, providing the request to the potential responders, receiving and organizing the responses, all electronically, and providing the organized electronic responses to the requestor.

Figure 1:
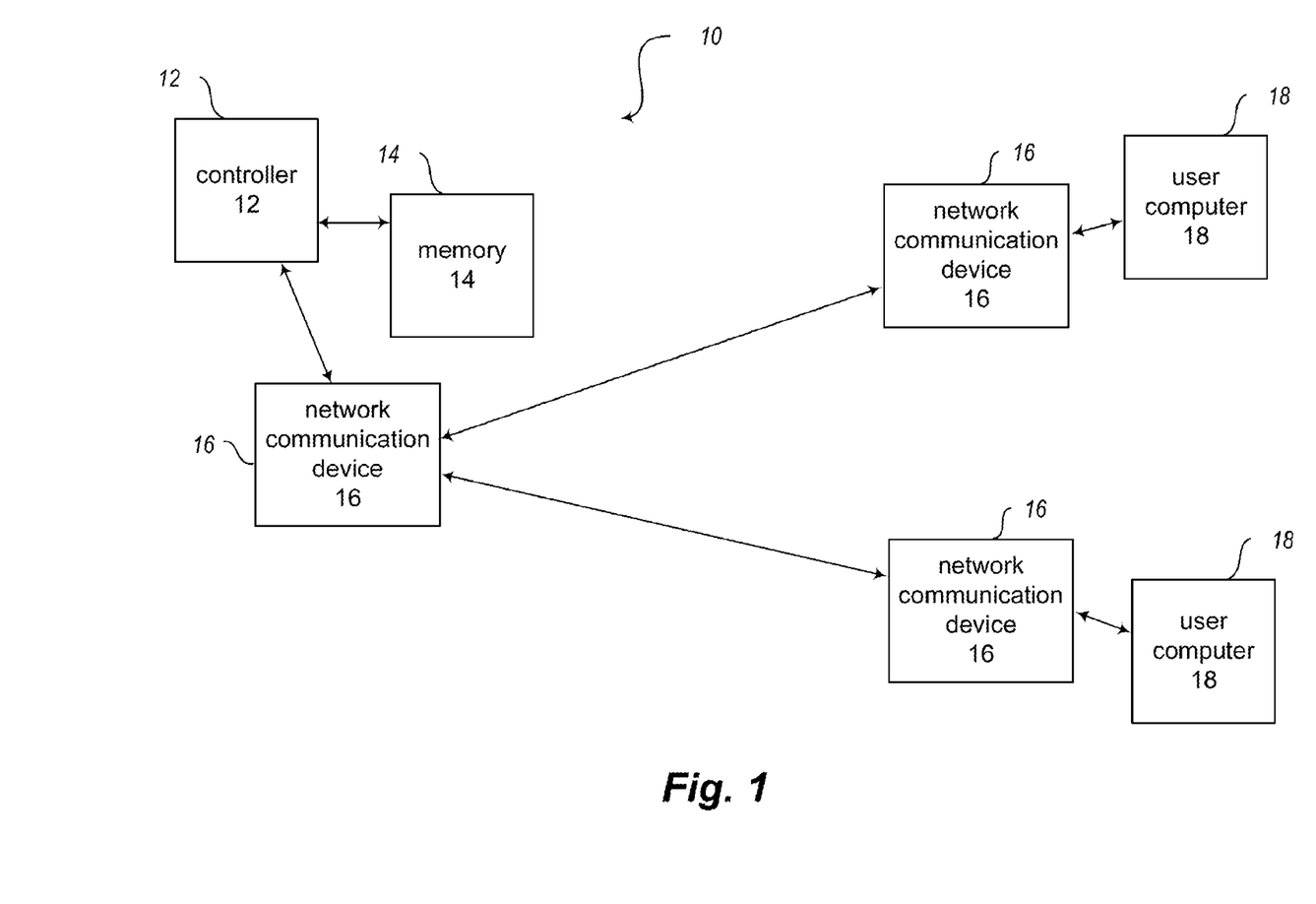
FIG. 1 is a schematic of a system for collecting structured information.

In another example, the earlier stated needs and others may further be met by a process of collecting and collaborating around reviews, the process including the steps of: receiving an electronic request for information about a specific product or service, attribute thereof, or class thereof from a requestor, associating one or more potential responders with the request for information, providing the request for information to the potential responders via an electronic format, receiving and organizing one or more electronic responses from the responders, and providing the organized electronic responses to the requestor. FIG. 1 illustrates a system 10 for implementing a demand driven process for collecting structured information. As shown in FIG. 1, the system 10 includes a controller 12, associated memory 14, network communication devices 16 and user computers 18. The controller 12 may be incorporated in a host server or other computer system as will be understood in light of the present disclosure. The controller 12 may be primarily responsible for executing the processes described herein, but is not required to be a dedicated controller 12. The memory 14 associated with the controller 12 may be structured in database format. However, it is contemplated that the memory 14 may be in any form or structure. As shown in FIG. 1, the network communication devices 16 enable communication between the controller 12 and the user computers 18. The network communication devices 16 may be any combination of wired and/or wireless devices. All of the elements of the system 10 are described in further detail below. The elements of the system 10 shown in FIG. 1 and described herein will be referenced in the description of the remaining figures.

Figure 2:
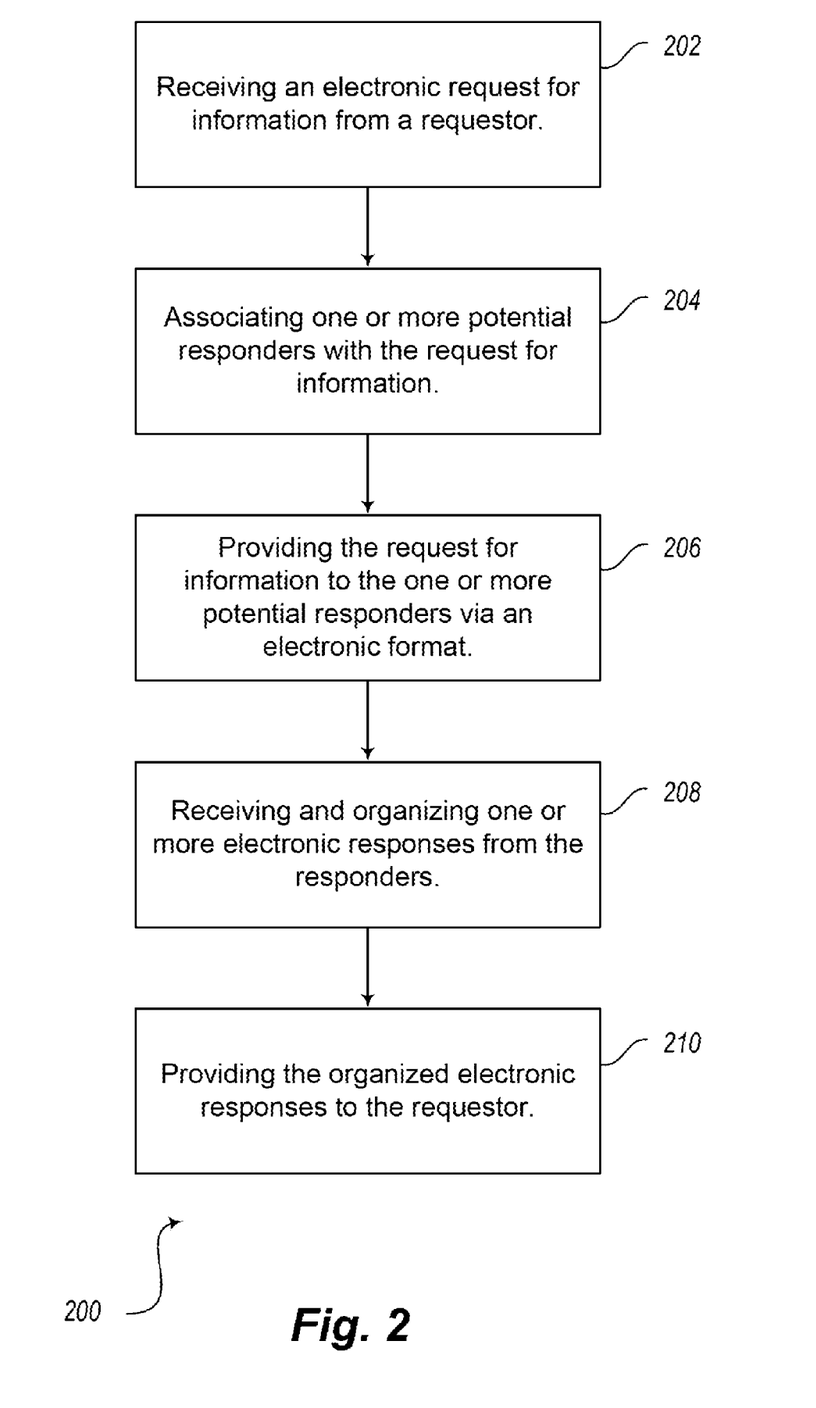
FIG. 2 is a flow chart depicting a method of collecting structured information.

FIG. 2 is a flow chart depicting a process 200 of collecting structured information. The process 200 shown in FIG. 2 utilizes the elements of the system 10 described above with respect to FIG. 1. As shown in FIG. 2, the first step 202 includes receiving an electronic request for information from a requestor. In the system 10 shown in FIG. 1, the electronic request may be received by the controller 12 from a user computer 18 via the network communication devices 16. For example, the user computer 18 may be a personal computer, cell phone, handheld computer, or any other computer. Although the requested information may be any type of information, it is contemplated that in an example of the process 200 shown in FIG. 2, the requested information is a review of a specific product or service, attribute thereof, or class thereof. The request for information can be structured in any of a number of various ways, such as, for example, star ratings and/or comments, thumbs up/thumbs down, etc., and can relate to any attributes of a product or service, for example a restaurant's prices and/or quality of service. Further, in the example shown in FIG. 2, the requestor is any person or party who initiates the request.

The second step 204 shown in FIG. 2 includes associating one or more potential responders with the request for information. The one or more potential responders may be provided to the controller 12 by the user computer 18 when the requestor makes the request in the first step 202. Alternatively, the one or more potential responders may be associated with the request by the controller 12 based on information stored in the associated memory 14. Similarly, the one or more potential responders may be associated with the request using both of these techniques and/or in any other manner. In one example, the one or more potential responders may be contacts in the requestor's social network or e-mail distribution list.

The third step 206 shown in FIG. 2 includes providing the request for information to the one or more potential responders via an electronic format. In this step 206, the controller 12 provides the request for information to various user computers 18 wherein the request may be received by the associated potential responders. The electronic format may be any electronic format. In a contemplated embodiment, the electronic format may be electronic mail. In another embodiment, the electronic format may be via a webpage. In another contemplated embodiment the electronic format may be a notification within an online social networking environment. Additionally, the electronic format may be an SMS message, instant message, automated voicemail message, any other personal communications medium, etc. It is also contemplated that the request for information may be forwarded to others such that request may benefit from the viral distribution techniques of social networks or email. It is also contemplated that when the one or more potential responders are associated with the request by the controller 12 based on information stored in the associated memory 14, as described above, the request for information can be broadcast across one or more networks in one click. In other words, a user may push the request to the user computers 18 in one electronic step or action. For example, the request may be sent to an individuals' status message on services like Twitter or Facebook, an individual's blog, an individual's social networking profile, etc. This example may be useful when broadcasting requests to groups and communities.

The fourth step 208 shown in FIG. 2 includes receiving and organizing one or more electronic responses from the responders. In this step, the controller 12 organizes responses received from one or more user computers 18 with the corresponding requests. In one contemplated example, the controller 12 associates each response with a request and stores the response in the memory 14. Accordingly, the controller 12 may access the responses for a given request as needed. Additionally, in at least one contemplated embodiment, each request may initiate an aggregation of relevant additional content and information, via search APIs, affiliate links to "expert" sites, or other medium, based upon keywords in requests (e.g., restaurant, camera, etc.), requests in their entirety, etc., the results of which are further aggregated with the responses in the fourth step 208. It is understood that additional content can refer to anything from "expert" information (e.g., expert ratings and expert reviews), helpful information (e.g., a definition), logistical information (e.g., a map), or actionable information (e.g., a link to a reservation service if the subject is a restaurant). In one example, the additional content sought by the controller 12 includes information linked or keyed off of the requested responders' information, such as, for example, their e-mail addresses. As a result, if a user's request is directed to information about products and services in Argentina and one of the requested responders has written a number of Argentina related reviews on a travel related web-site that are linked to the requested responder's e-mail address, the controller 12 may include those reviews in the aggregated responses. Additionally, the controller 12 may provide the existing reviews (keyed off the e-mail addresses of the requested responders) to the user prior to the user submitting the request, such that is the existing information is sufficient, the user may choose to not send the request for information. All of the aggregated information and data may then be sortable and searchable within the memory 14. Further, it is contemplated that the various data collected may be related by the controller 12 such that trails of requests and responses may be identified, collected, tracked or otherwise utilized.

The fifth step 210 shown in FIG. 2 includes providing the organized electronic responses to the requestor. As described above with respect to the third step 206, the electronic format may be any electronic format. Also, the electronic format may be the same or a different format as the one used in the third step 206. In one contemplated example, the electronic format is a web page displaying the compiled responses received to the present time. Accordingly, it is understood that the electronic format may encourage additional collaboration by the users based on the content provided in the electronic format. In this example, collaboration is the process by which two or more parties or individuals contribute to a conversation with a specific objective, synchronously and asynchronously, implicitly and explicitly. For example, each item and/or topic reviewed and/or discussed will have an instance (e.g., a dedicated web page) which may be the repository of all reviews/comments/information for that item/topic.

Additionally, in examples in which the compiled information is publicly displayed, a user may review input that others have left without submitting a request. In other words, if someone wanted input on "carpenter" in their area, and someone else had already used the service to collect input on "carpenter" in that same area, the compiled data provided to the prior user may be made available to the new user, perhaps providing enough information for the new user that the new user would choose not to initiate a request.

The system 10 and process 200 described above with respect to FIGS. 1 and 2 may be embodied in many different forms and examples. The following description with reference to FIGS. 3-10 is an example of certain contemplated embodiments for purposes of further illustrating and providing context for the invention and not as a limiting example.

Figure 3:
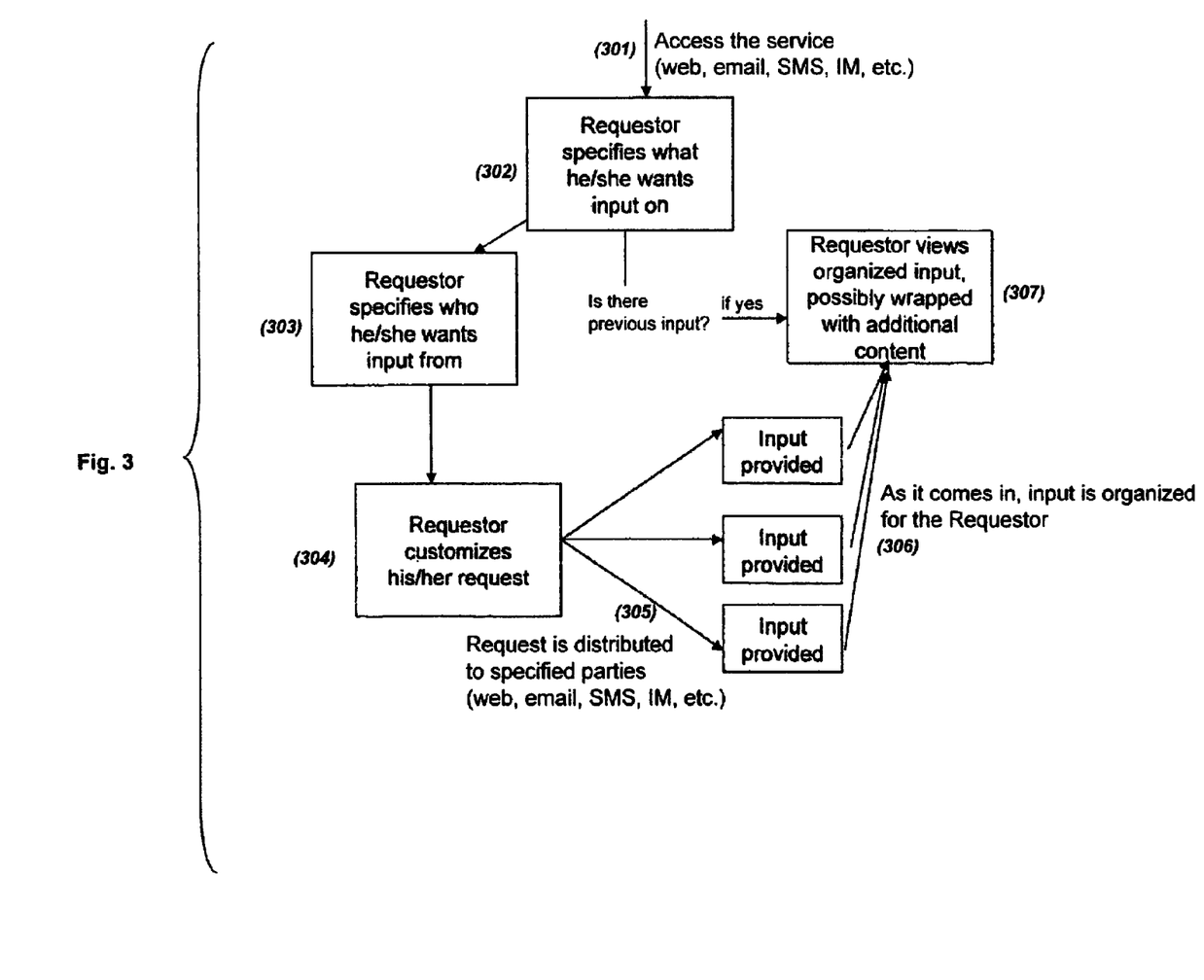
FIG. 3 is another flow chart depicting a method of collecting structured information.
Figure 4:
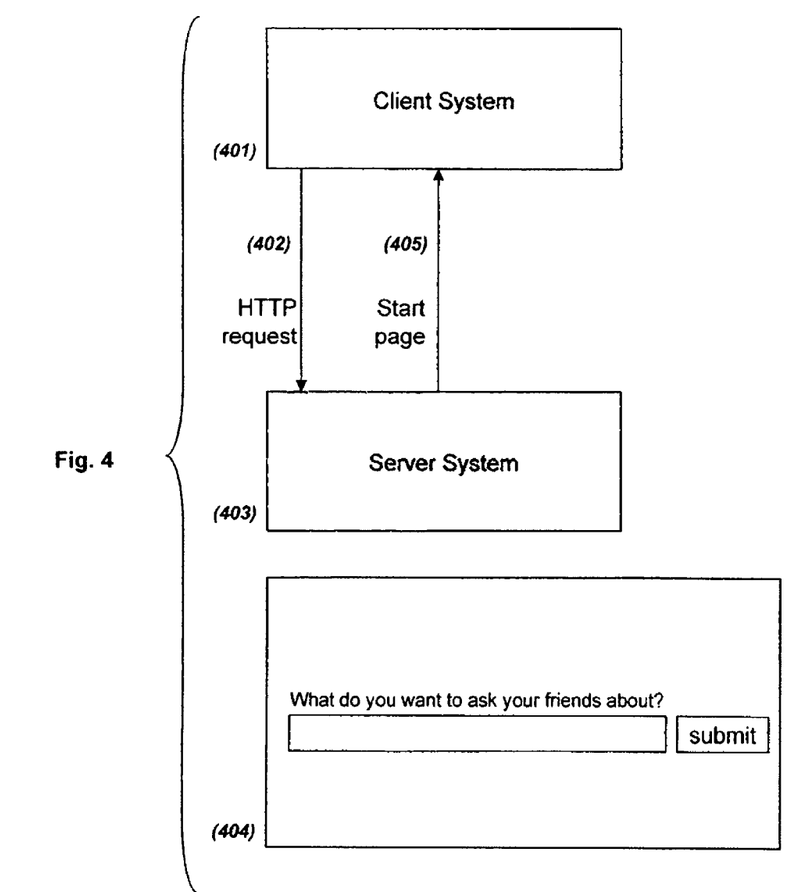
FIGS. 4-10 are sample representations of webpage diagrams that may be utilized in one example of a system and/or method of collecting structured information.
Figure 5:
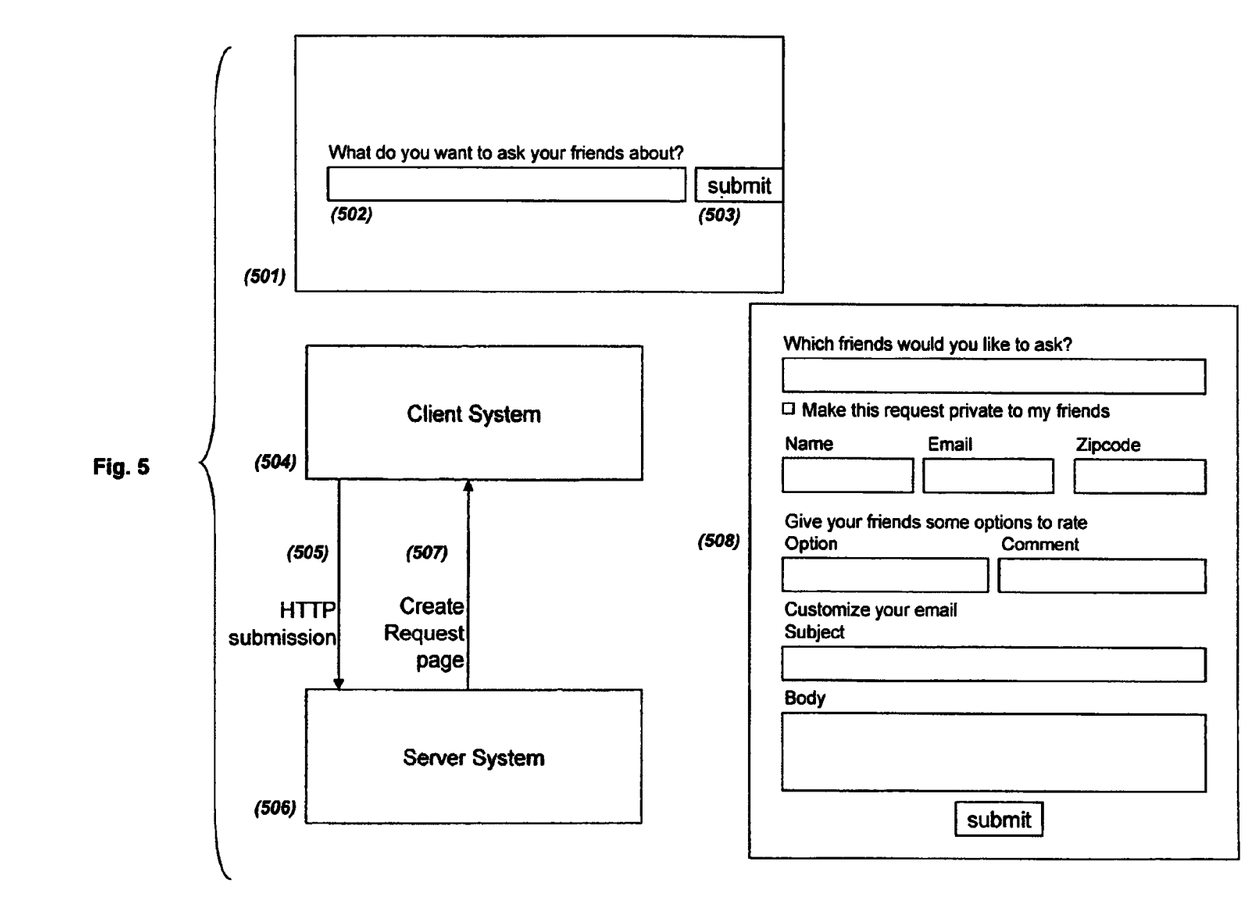
Figure 6:
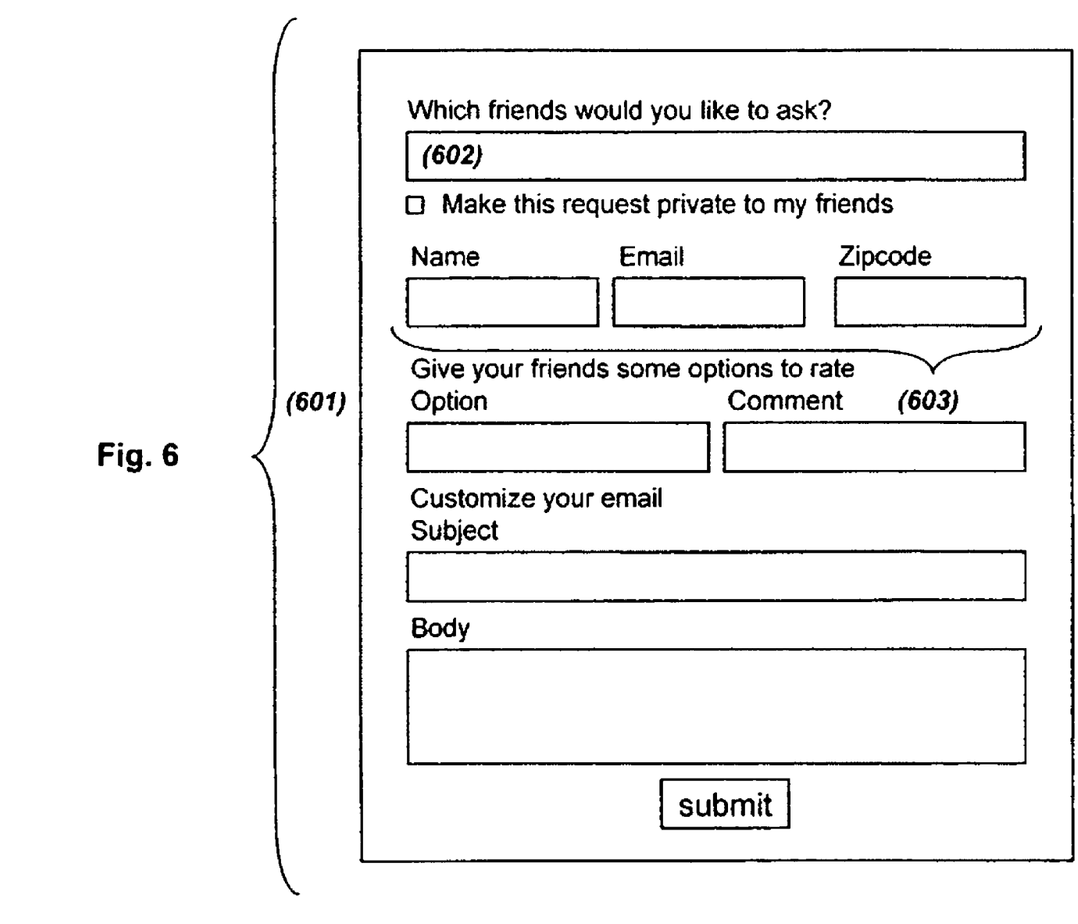
Figure 7:
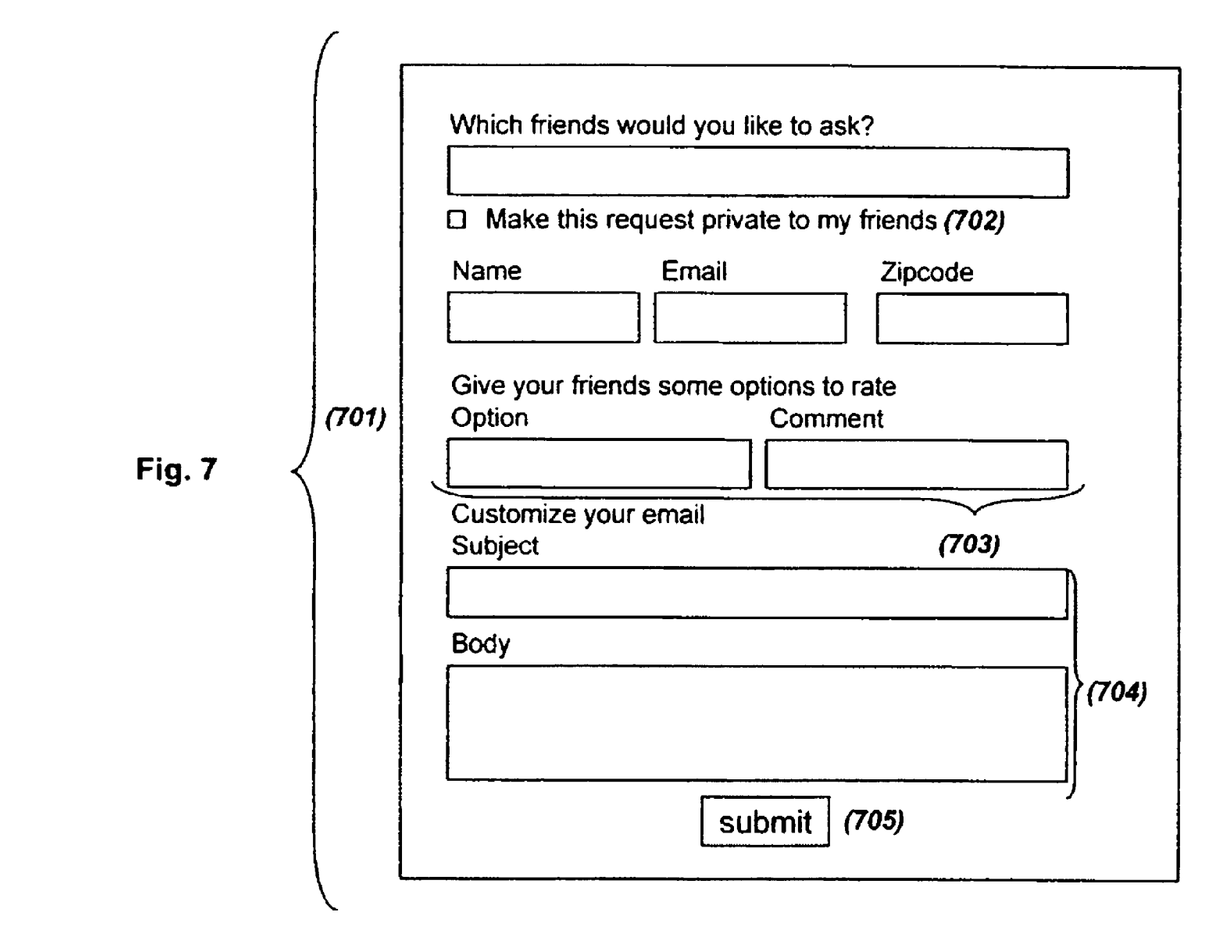
Figure 8:
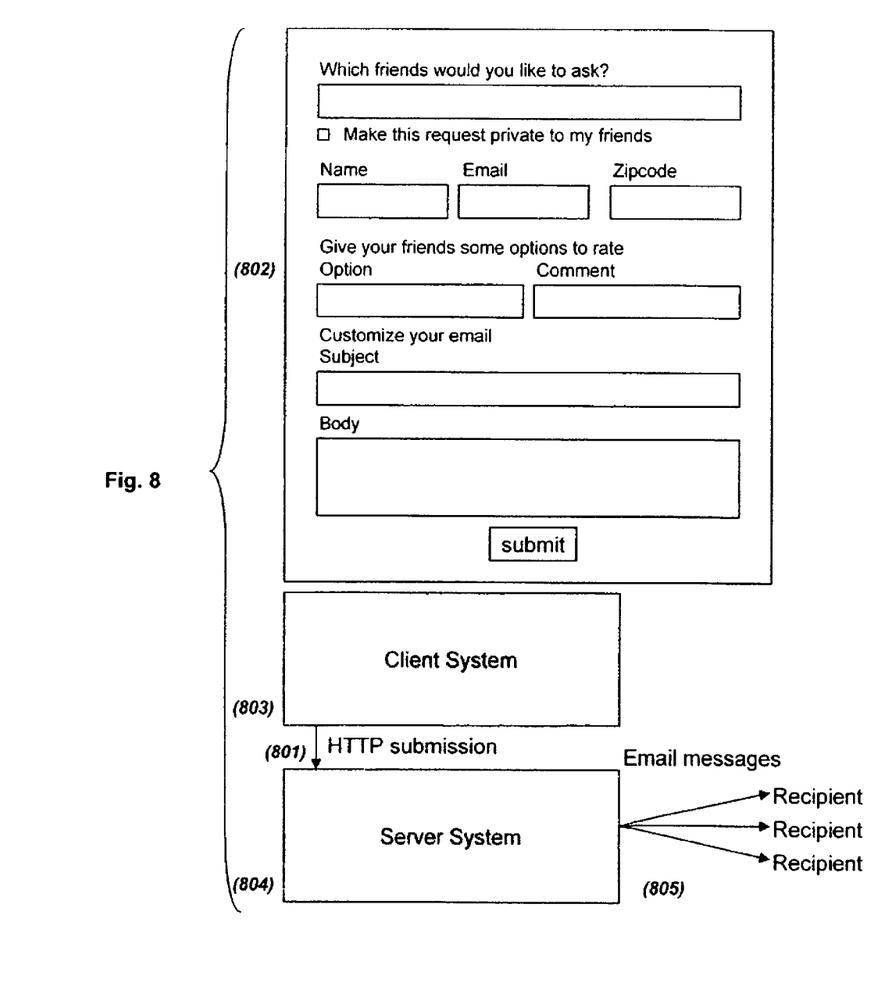
Figure 9:
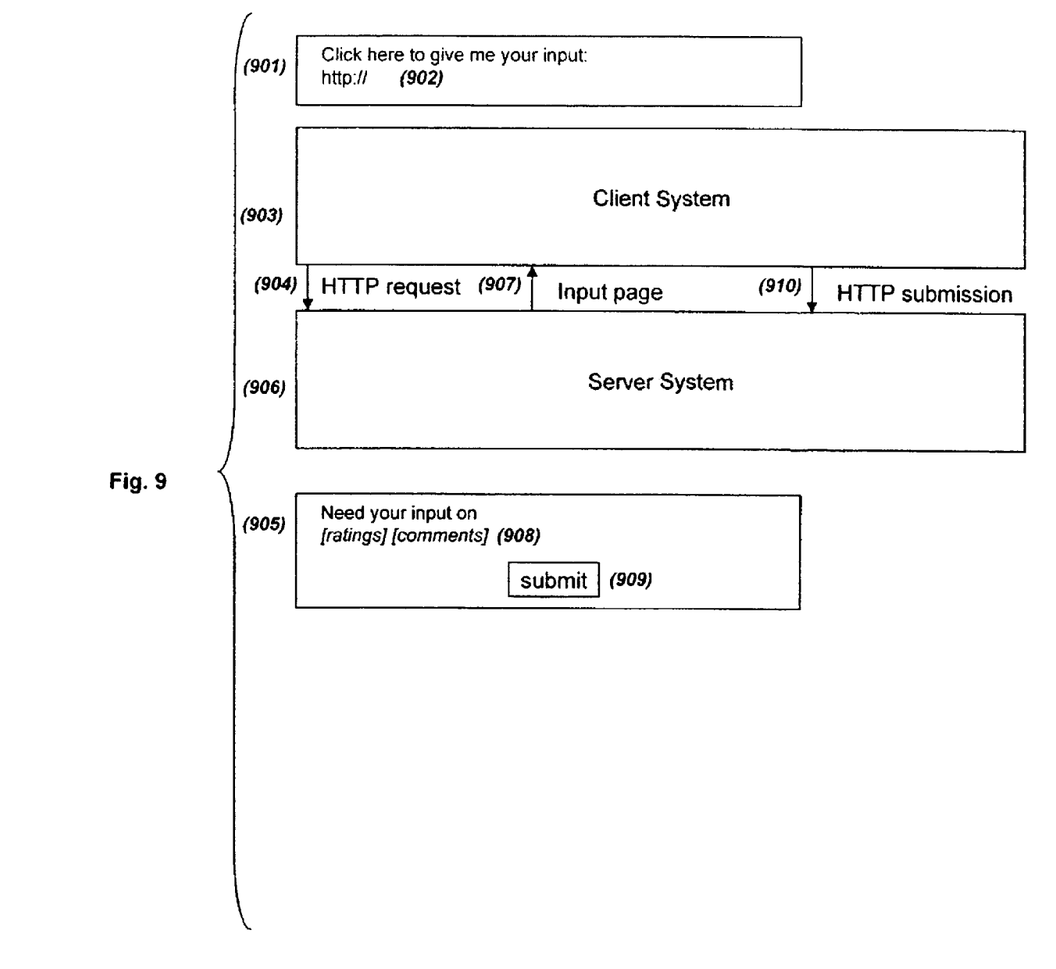
Figure 10:
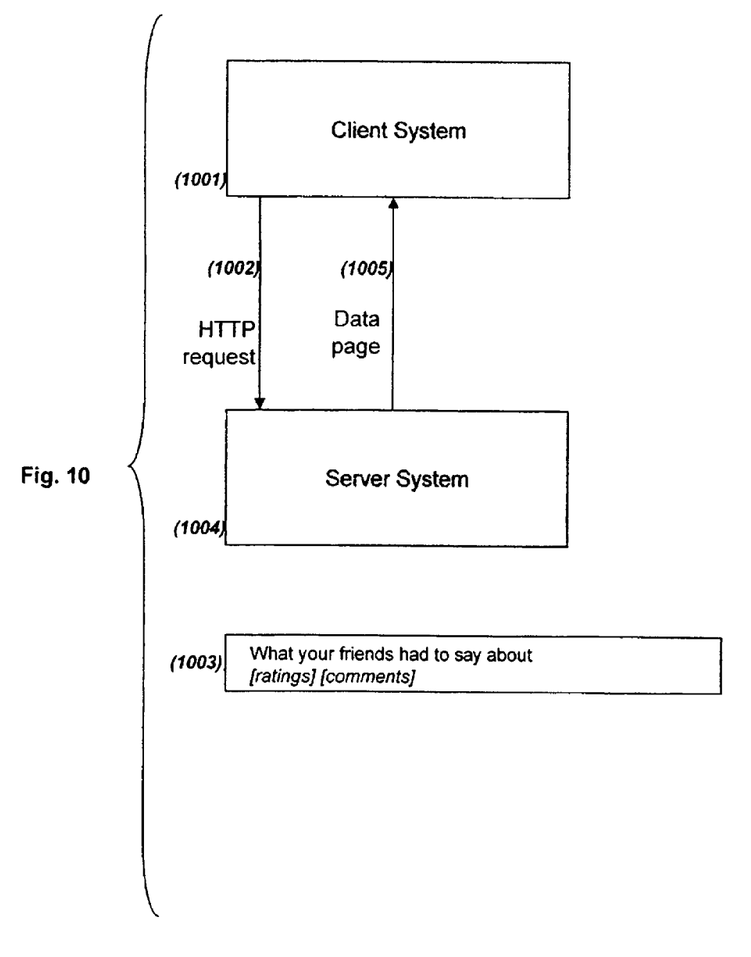

As shown in FIG. 3, the process 200 may be embodied in a service provided, for example, through the internet. Accordingly, the process 200 may include the steps described herein. In step one, 301 a user may access the service via the Internet (e.g., a web page), their mobile phone (e.g., by placing a call, sending a text, etc.), through Instant Message clients, and through other communication platforms. In the example shown in FIG. 4, a client system 401 (user computer 18) sends a request 402 to the server system 403 (controller 12) for a web page 404 ("Start" page) from the service. The server system sends (405) this page to the client system. This page has an input field in which the user can enter what he/she would like input on.

Then, in step two 302, the user identifies what he or she wants input on (e.g., "chill date restaurant" or "dentist"). As an extension of step two 302, the service then checks to see if input has been previously provided on the identified topic. If so, that information can be incorporated into the responses herein. In the example shown in FIG. 5, on the "Start" webpage 501, the user enters into a text field what he/she wants input on 502 and then activates the submission mechanism 503 on the page, at which point the client system 504 submits the data 505 to the server system 506. In this example, if the input field is empty, the server system will re-load the web page. If any characters whatsoever have been entered into the text field, the server system will load 507 a different webpage, the "Create Request" web page 508, on the client system 504. Everything input and submitted on or by the client system 504 will be logged by the server system, so that even if a user abandons his/her request, the service will still have record of the event.

It is contemplated that the type of information sought by the user may include various types of information, whether in broad terms or more narrow. In one example, the information sought may be reviews. A review may broadly understood to be a review of a person, place or thing (e.g., item, activity, etc.) or a recommendation or rating thereof. In another example, the information sought may be more narrowly related only to products and services. Thus, various services may be developed and tailored to cater to the needs of users looking for various scopes of information.

In step three 303, the individual identifies who he/she wants input from. Depending upon how the service is accessed, the individual can specify email addresses, phone numbers, names, screen names, or other identifiers. Also, if previous input has been left on the identified topic (as determined in step two 302), then select results are displayed to the user as a preliminary response. In the example shown in FIG. 6, the "Create Request" webpage 601 loaded onto the client system presents the requestor with several tasks and options. The primary task for the user is to input the email addresses of the parties the user would like input from 602. The secondary task for the user is to input his/her name and email address (zip code is optional in this example) 603. Of course, there may be other tasks for the user.

Through step four 304, if the user chooses, he/she may customize the request, for example, by: adding specific options related to the request; customizing the text of the request; setting preferences associated with the request; etc. In the example shown in FIG. 7, The "Create Request" webpage 701 loaded onto the client system also has several options around customization of the request. A first option for the user is to specify how they would like the privacy of their request to be handled 702. A second option for the user is to identify what structure to apply to the request, and provide additional information as it relates to the chosen structure (e.g., providing options for recipients to rate 703). A third option for the user is to customize the email message that will be sent to the specified recipients of the request 704. Of course, there may be other options for the user. Upon completion of select required tasks as well as any non-required tasks and options, the user will execute submission of the input data from the client system to the server system 705.

The request is then distributed to identified parties in step five 305. The request, as created by the requestor, is distributed to the parties (individuals, groups, etc.) specified. If email addresses were provided, then emails are generated and sent; if phone numbers are provided, either voice messages or text messages are generated and sent; if originated on a social network or similar platform, messages will be generated and sent; etc. In the example shown in FIG. 8, upon submission 801 of the completed "Create Request" webpage 802 from the client system 803 to the server system 804, the server system generates and distributes the request to the identified parties 805. More specifically, the server system generates email messages (with either the standard language or the language specified by the requestor) containing hyperlinks back to the service, and then sends those email messages over the Internet to each of the parties that were identified by the requestor on the "Create Request" page.

Next, in step six 306 the recipients of the request provide input as requested. If the recipient chooses (and, in cases whether the requestor can set such preferences, the requestor has allowed), the recipient can also forward the request to others. Input is then collected and organized by the service in such a way that—again, if allowed by the requestor—each party sees what input has already been provided, and can add more input (e.g., new options, responses to comments, etc.) in a collaborative way. When the request is forwarded to additional recipients, the request can be tracked and surfaced. In other words, if person A sends the original request to person B, and person B forwards the request to person C who then replies, person A may be able to see that person B forwarded the request to person C to establish context and relationship. In the example shown in FIG. 9, recipients receive emails 901 from the requestor. When recipients click on the hyperlinks back to the service 902, the client system 903 requests 904 a specific "Input" page 905 (the address of the page identifies both the recipient as well as the request) from the server system 906. The server system sends back the appropriate input page 907. On that page 905, the recipient provides input 908 as requested by the requestor, and then activates the submission mechanism 909. The client system then transmits the input data to the server system 910, where it is saved.

Finally, in step seven 307, the input is viewed by the requestor. The requestor views the structured input provided by others in an organized, sortable and searchable way. Further, relevant input from prior requests made through the service will be displayed, alongside additional content (e.g., "expert" information from a host of sources). In the example shown in FIG. 10, the requestor accesses the service through his/her client system 1001, and specifically requests 1002 the page with the collected input 1003. The server system 1004 returns 1005 the data page to the client system. The data page displays structured input in an organized, sortable and searchable way, possibly wrapped with additional content.

As shown by the above descriptions, aspects of the systems are controlled by one or more controllers. Typically, the one or more controllers are implemented by one or more programmable data processing devices. The hardware elements, operating systems and programming languages of such devices are conventional in nature, and it is presumed that those skilled in the art are adequately familiar therewith. Accordingly, any device that may be used to perform the functions described herein with respect to the controller may be substituted for the controllers described in the examples above. For example, in some instances the functions of the controller may be embodied in programmable instructions, for example, on a CD-ROM, a flash drive or any other memory.

For example, the controller may be a microprocessor in a portable arrangement, such as, for example, a cellular phone, a personal digital assistant, an audio/video playing device, etc. These systems, including microprocessors, are referred to generically herein as computer systems. In another example, the controller maybe a PC based implementation of a central control processing system. The PC based system contains a central processing unit (CPU), memories and an interconnect bus. The CPU may contain a single microprocessor (e.g. a Pentium microprocessor), or it may contain a plurality of microprocessors for configuring the CPU as a multi-processor system. The other components of the computer system described above include memories, including a main memory, such as a dynamic random access memory (DRAM) and cache, as well as a read only memory, such as a PROM, an EPROM, a FLASH-EPROM, or the like. The system also includes mass storage devices such as various disk drives, tape drives, etc. In operation, the main memory stores at least portions of instructions for execution by the CPU and data for processing in accord with the executed instructions.

The mass storage may include one or more magnetic disk or tape drives or optical disk drives, for storing data and instructions for use by CPU. For example, at least one mass storage system in the form of a disk drive or tape drive stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The computer system also includes one or more input/output interfaces for communications, shown by way of example as an interface for data communications with one or more processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the controller. For example, the computer system may include a graphics subsystem to drive the output display. The output display, for example, may include a cathode ray tube (CRT) display, or a liquid crystal display (LCD) or other type of display device. Although not shown, a PC type system implementation typically would include a port for connection to a printer. The input control devices for such an implementation of the computer system would include the keyboard for inputting alphanumeric and other key information. The input control devices for the computer system may further include a cursor control device (not shown), such as a mouse, a touchpad, a trackball, stylus, or cursor direction keys. The links of the peripherals to the computer system may be wired connections or use wireless communications.

The computer system runs a variety of applications programs and stores data, enabling one or more interactions via the user interface provided, and/or over a network to implement the desired processing.

The components contained in the systems are those typically found in general purpose computer systems. Although illustrated as a PC type device, those skilled in the art will recognize that the class of applicable computer systems also encompasses systems used as servers, workstations, network terminals, and the like. In fact, these components are intended to represent a broad category of such computer components that are well known in the art.

A software or program product may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Terms relating to computer or machine "readable medium" that may embody programming refer to any medium that participates in providing code or instructions to a processor for execution. Such a medium may take many forms, including but not limited to non-volatile media, volatile media, and transmission media. Non-volatile media include, for example, optical or magnetic disks, such as any of the storage devices in the computer system. Volatile media include dynamic memory, such as main memory. Transmission media include coaxial cables, copper wire and fiber optics including the wires that comprise a bus within a computer system. Transmission media can also take the form of electric or electromagnetic signals, or acoustic or light waves such as those generated during radio frequency or infrared data communications. In addition to storing programming in one or more data processing elements, various forms of computer readable media may be involved in carrying one or more sequences of one or more instructions to a processor for execution, for example, to install appropriate software in a system intended to serve as the controller 14.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A computer-implemented process, comprising:
   receiving from a requestor an electronic request for reviews that provide ratings regarding quality of an indicated thing;
   identifying one or more potential responders, and associating the one or more potential responders with the electronic request;
   determining that at least one of the associated one or more potential responders has previously made first information available regarding the quality of the indicated thing, the determining being performed by a configured computer system;
   providing at least some of the first information in an electronic form to the requestor;
   after the providing of the at least some first information to the requestor, receiving an indication from the requestor to provide the electronic request to the associated one or more potential responders, and providing the electronic request to the associated one or more potential responders in an electronic format by automatically posting the electronic request as an update regarding the requestor on a social networking platform of which the requestor and the associated one or more potential responders are members, the providing of the electronic request being performed by the configured computer system;
   receiving and organizing multiple electronic reviews that are each from one of the associated one or more potential responders in response to the provided electronic request, the organizing including creating an aggregation of the multiple electronic reviews that is associated with the electronic request;
   updating the created aggregation to include the first information, the updating of the created aggregation being performed by the configured computer system; and
   providing electronic access to the updated created aggregation to the requestor.

2. The process of claim 1 wherein the configured computer system is associated with a social networking platform, and wherein the identifying of the one or more potential responders is based at least in part on established friend relationships of the one or more potential responders with the requestor within the social networking platform.

3. The process of claim 1 wherein the electronic request is received via a computer network.

4. The process of claim 1 wherein the electronic request is received via a mobile communication device.

5. The process of claim 1 wherein the electronic request from the requestor indicates contact information for the associated one or more potential responders, and wherein the method further comprises using the included contact information to further provide the electronic request to one or more of the associated one or more potential responders.

6. The process of claim 5 wherein the contact information for the associated one or more potential responders is associated with an account of the requestor with the social networking platform.

7. The process of claim 1 further including associating additional electronic content with the received multiple electronic reviews and including the additional electronic content with the updated created aggregation.

8. The process of claim 7 wherein the additional electronic content includes information collected from a previous request by another requestor.

9. The process of claim 7 wherein the additional electronic content includes information gathered from available information resources other than the associated one or more potential responders.

10. The process of claim 7 wherein the additional electronic content includes attributes regarding the quality of the indicated thing, and wherein the indicated thing is at least one of an indicated person and of an indicated place.

11. The process of claim 7 wherein the first information is collected implicitly by collecting information already publicly available.

12. The process of claim 1 wherein the providing of the electronic request to the associated one or more potential responders is performed in response to an indication from the requestor that is received after the providing of the at least some first information in the electronic form to the requestor.

13. The process of claim 1 further comprising enabling other requestors to obtain electronic access to the updated created aggregation.

14. The process of claim 1 wherein the providing of the electronic request further includes automatically broadcasting the electronic request across a plurality of different communication channels in response to a single electronically communicated indication from the requestor to provide the electronic request to associated the one or more potential responders.

15. The process of claim 1 wherein the indicated thing includes at least one of an indicated product and an indicated service, and wherein the received multiple electronic reviews each includes at least one rating by one of the associated one or more potential responders regarding quality of the at least one of the indicated product and of the indicated service.

16. A system, comprising:
   a memory; and
   a controller associated with the memory and in communication with one or more user computers via one or more network communication devices, wherein the controller is adapted for:
      receiving from a requestor via a first user computer an electronic request for reviews that provide evaluations regarding one or more attributes of at least one of an indicated product and an indicated service;
      identifying one or more users using at least one of the electronic request and information stored in the memory, and associating the one or more users with the electronic request;

determining that at least one of the associated one or more users has previously made first information available related to the at least one of the indicated product and of the indicated service;

providing at least some of the first information in an electronic form to the requestor related to the at least one of the indicated product and of the indicated service;

after the providing of the at least some first information to the requestor, receiving an indication from the requestor to provide the electronic request to the associated one or more users and providing the electronic request to the associated one or more users in an electronic format accessible via the one or more user computers, the providing of the electronic request including automatically posting the electronic request as an update regarding the requestor on a social networking platform of which the requestor and one or more of the associated one or more users are members;

receiving and organizing in the memory multiple electronic reviews that are each from one of the associated one or more users in response to the provided electronic request, the organizing including creating an aggregation of the multiple electronic reviews that is associated with the electronic request; and providing to the requestor, in an electronic form accessible via the one or more user computers, access to the created aggregation and to the at least some first information.

17. The system of claim 16 wherein the first information was previously made available by one or more of the associated one or more users before the receiving of the electronic request from the requestor.

18. The system of claim 16 wherein the controller is further adapted for associating additional electronic content with the created aggregation.

19. The system of claim 16 wherein at least one of the received multiple electronic reviews each further includes at least one comment by one of the associated one or more users related to the at least one of the indicated product and of the indicated service.

20. The system of claim 16 wherein the one or more attributes of the at least one of the indicated product and of the indicated service include quality of the at least one of the indicated product and of the indicated service, and wherein the evaluations regarding the one or more attributes include ratings of the quality of the at least one of the indicated product and of the indicated service.

21. A non-transitory computer-readable storage medium having computer-executable instructions stored thereon, the computer-executable instructions configuring a computer system to perform the steps of:

receiving from a requestor an electronic request for reviews that provide ratings regarding one or more attributes of at least one of an indicated person and of an indicated place and of an indicated thing;

identifying one or more potential responders, and associating the one or more potential responders with the electronic request;

determining that at least one of the associated one or more potential responders has previously made first information available regarding the quality of the at least one of the indicated person and of the indicated place and of the indicated thing, the determining being performed by a configured computer system;

providing at least some of the first information in an electronic form to the requestor;

after the providing of the at least some first information to the requestor, receiving an indication from the requestor to provide the electronic request to the associated one or more potential responders to obtain additional information distinct from the first information, and providing the electronic request to the associated one or more potential responders in an electronic format;

receiving and organizing multiple electronic reviews that are each from one of the associated one or more potential responders in response to the provided electronic request, the organizing including creating an aggregation of the multiple electronic reviews and of the first information that is associated with the electronic request; and providing electronic access to the created aggregation to the requestor.

22. The non-transitory computer-readable storage medium of claim 21 wherein the one or more potential responders are members of a social networking platform, and wherein the providing of the electronic request includes automatically posting the electronic request as an update regarding the requestor on the social networking platform.

23. The non-transitory computer-readable storage medium of claim 21 wherein the computer-executable instructions further configure the computer system to perform modifying the created aggregation to include additional electronic content.

24. The non-transitory computer-readable storage medium of claim 21 wherein at least one of the received multiple electronic reviews each further includes at least one comment by one of the associated one or more potential responders related to the at least one of the indicated person and of the indicated place and of the indicated thing.

* * * * *